United States Patent [19]

Krezanoski

[11] 3,911,107

[45] Oct. 7, 1975

[54] IODINE COMPOSITION AND DISSIPATING SOLUTION

[75] Inventor: Joseph Z. Krezanoski, Los Altos, Calif.

[73] Assignee: Flow Pharmaceuticals, Inc., Palo Alto, Calif.

[22] Filed: Dec. 18, 1972

[21] Appl. No.: 315,793

[52] U.S. Cl. .................................. 424/78; 424/150
[51] Int. Cl.² ................... A61K 31/74; A61K 33/18
[58] Field of Search ............................ 424/78, 150

[56] References Cited
UNITED STATES PATENTS

| | | | |
|---|---|---|---|
| 2,554,850 | 5/1951 | Binda | 88/65 |
| 3,028,300 | 4/1962 | Cantor et al. | 424/150 |
| 3,029,183 | 4/1962 | Winicov et al. | 424/150 |
| 3,285,816 | 11/1966 | Kaplan et al. | 424/150 |
| R23,297 | 11/1950 | Hyman, Jr. et al. | 88/65 |

OTHER PUBLICATIONS

Chemical Abstracts, Vol. 55, No. 1802i (1961).
Chemical Abstracts, Vol. 56, No. 1039h (1962).
Chemical Abstracts, Vol. 61, No. 16273g (1964).

*Primary Examiner*—Albert T. Meyers
*Assistant Examiner*—Daren M. Stephens
*Attorney, Agent, or Firm*—Finnegan, Henderson, Farabow & Garrett

[57] ABSTRACT

An aqueous, antiseptic, iodophor solution is provided containing iodine, a water soluble iodide salt or hydriotic acid, polyvinyl alcohol and boric acid. The iodophor solution may be employed to sterilize a broad range of animate and inanimate objects, including contact lenses. Additionally, the iodophor solution, or similar iodophor solutions which do not contain boric acid, may be employed in visual temperature sensing devices. The visual temperature sensing devices comprise a transparent vessel containing the iodophor solution. Also disclosed is an aqueous solution for dissipating, at a controlled rate, available iodine contained in an iodophor. The aqueous dissipating solution contains sorbic acid or soluble salts thereof and ethylenediaminetetraacetic acid or soluble salts thereof.

17 Claims, No Drawings

IODINE COMPOSITION AND DISSIPATING SOLUTION

FIELD OF THE INVENTION

The present invention pertains to aqueous, antiseptic iodophor solutions containing polyvinyl alcohol, boric acid, iodine, and water soluble iodide salts or hydriotic acid. The solutions have fungicidal, virucidal, and sanitizing properties. The present invention also pertains to an aqueous solution for dissipating, at a controlled rate, available iodine contained in an iodophor and to a visual temperature sensing device containing an iodophor solution.

BACKGROUND OF THE INVENTION

The use of iodine as a germicidal agent is well known. Iodine as such or in various molecular combinations has been used medicinally since soon after its discovery. Iodine was used to treat battle wounds as early as 1839. In various forms, iodine is an outstanding germicide for the skin, for wounds both internal and external, and for sterilization purposes including such things as surgical instruments. It has also been used to disinfect drinking water, swimming pools, and the like, and to sanitize utensils and other objects which might come in contact with organic material subject to decay and bacterial attack. Iodine is an outstanding therapeutic agent which is useful against a great variety of organisms including viruses, bacteria, spores, yeast, molds, protozoa, fungi, worms, nematodes, and the like. In addition, iodine has a relatively low tissue toxicity. The relatively low toxicity is due to the breakdown of iodine to the iodide ion ($I_2 \rightarrow I^-$); the iodide ion is non-toxic.

Iodine, however, does have some serious drawbacks. It is a strong primary irritant and a sensitizer. Furthermore, while it destroys bacterial protein, it also, to some extent, destroys animal protein as well. Additionally, iodine has undesirable odor and staining properties.

It has been discovered that certain compounds act as carriers or "taming" agents for iodine. The term iodophor is used to refer to any product in which surface active agents act as carriers and solubilizing agents for iodine. Known carriers include a variety of high molecular weight materials such as starch and various synthetic polymers. Typical Synthetic polymers are exemplified by polymeric vinyl lactams and high molecular weight oxyalkylene derivatives of reactive hydrogen compounds generally characterized as the alkylene oxide condensates having surface active properties. Specific examples of suitable polymeric material include polyvinyl pyrrolidone, polyvinyl oxizolidone, polyvinyl imidazole, polyvinyl morpholone, polyvinyl caprolactam, polyvinyl alcohol, and ethylene and propylene oxide condensates with alcohols, amides, and phenols.

Iodophors generally enhance the bactericidal activity of the iodine while reducing vapor pressure and odor. In addition, iodophors decrease staining properties and permit wide dilutions with water. Additionally, the irritant properties of iodine are markedly reduced when employed in the form of an iodophor.

A particularly useful iodophor composition results from the interaction between iodine, potassium iodide, and polyvinyl alcohol in a water solution. Such a composition is disclosed in Mokhnach, "Iodine-High Polymers and Their Use in Medicine and Veterinary Medicine", (Botan,Inst. im. Komarova, Leningrad) *Iodinol Med.Vet.Eksp.Klin.Issled. Akad. Nauk S.S.S.R. Bot-.Inst.*, 1967, 5-20 (Russ.). This composition has been used to treat purulent surgical diseases, varicose ulcers, thermic and chemical burns, and in veterinary practice to treat a wide variety of diseases in animals. It is an effective antiseptic, equally effective with respect to gram positive and gram negative microflora, viruses, and fungi. The chemotherapeutical index,i.e., ratio of maximum endurable dose to the medicinal dose of this composition is very large. It has been found, however, that this composition has a somewhat limited shelf life.

Complexes of polyvinyl alcohol-boric acid-iodine are also known to possess bactericidal properties. See *Acta Polon. Pharm*, Vol. 20, No. 6, pp. 455–7 (1963); and *Klin Oczna*, 36(1), pp. 27–32 (1966).

The present invention pertains to an aqueous iodophor solution having a long shelf life coupled with a broad range of germicidal, fungicidal, and sanitizing properties. The solutions of the present invention, which may be in the form of concentrates or dilute free iodine releasing solutions, may be used for cleaning, sanitizing and disinfecting inanimate as well as animate objects. In addition, the iodophors of the present invention display a unique temperature sensing phenomena. The present invention also includes an aqueous solution which permits dissipating, at a controlled rate, available iodine contained in iodophor solutions.

SUMMARY OF THE INVENTION

The present invention pertains to aqueous antiseptic iodophor solutions containing:
  a. from about 0.00005% to about 10% by weight iodine;
  b. from about 0.0001% to about 20% by weight of a water soluble iodide salt or hydriotic acid;
  c. from about 0.001% to about 25% by weight polyvinyl alcohol, and
  d. from about 0.001% to about 10% by weight boric acid.

The remainder of the composition may comprise solely water or may include various other ingredients which will impart special properties. For example, stability of the solution is enhanced if the pH is adjusted to within the range of about 3 to 8. This may be accomplished by the addition of any poorly oxidizable acid. In addition, various alkali metals and alkaline earth metal salts may be added to the composition to adjust the osmotic properties (tonicities) of the solutions to make them better tolerated by living tissues. Similarly, various conventional neutral anionic, cationic, and nonionic detergents may be added to the solution to increase wetting properties.

The present invention also embraces an aqueous solution for dissipating, at a controlled rate, available iodine contained in an iodophor. The dissipating solution, which may be used with the iodophor solution of the present invention, as well as with other iodophor solutions, comprises an aqueous solution of
  a. from about 0.01% to about 5% by weight sorbic acid or a soluble salt thereof; and
  b. from about 0.01% to about 5% by weight ethylenediaminetetraacetic acid or a soluble salt thereof.

A unique property of the iodophor solutions of the present invention, and similar iodophor compositions which do not contain boric acid, is a color change apparent at different temperatures. At room temperature, such iodophor solutions have a deep burgundy color. In varied low concentrations of the iodophor, the solution is colorless at elevated temperatures, but regains its deep burgundy color as the temperature is lowered. Because of this property, such iodophor solutions may be employed in visual temperature sensing devices.

DETAILED DESCRIPTION OF THE INVENTION

The aqueous antiseptic iodophor solutions of the present invention contain iodine, a water soluble iodide salt or hydriotic acid, polyvinyl alcohol, and boric acid. It is recognized, of course, that the solutions of the present invention do not contain the various recited ingredients as such. In the solution, the iodine forms complexes with the polyvinyl alcohol and the boric acid and the various compounds, such as the water soluble salts, will at least to some extent ionize.

Iodine is one of the oldest known antiseptics still in current use. Despite certain disadvantages, iodine is one of the most valuable antiseptics because of its broad spectrum germicidal and virucidal efficacy. In the solutions of the present invention, certain ingredients are effective to complex, tame, and stabilize the iodine while retaining the rapid fungicidal, bactericidal and virucidal properties of the iodine. The disadvantages inherent in conventional alcoholic or water-alcoholic solutions of molecular or crystalline iodine are obviated, while the broad spectrum efficacy is retained.

The advantages of the solutions of the present invention over conventional iodine solutions include reduction of odor, reduction in staining properties, and improved wetting and cleaning properties because of reduced surface tension (to about 40 -72 dynes/cm$^2$). Furthermore, the iodine taming effect achieved by the compositions of the present invention provides better tolerance by living tissue which is particularly important for use on and about the eye and other mucous membranes. In addition, the compositions of the present invention provide flexibility by permitting the addition of conventional detergents and physiological salts without immediate loss of germicidal action due to the available iodine.

The compositions of the present invention may contain from about 0.00005% to about 10%, and preferably about 0.002% to about 5.0% by weight iodine. The solutions may be prepared in the form of concentrates and subsequently diluted to the concentration desired for a particular use (typically 5 to 100 ppm available iodine). Dilution can be achieved with purified water or with the unique dissipating solution disclosed herein.

The iodophor compositions of the present invention, in dilutions of up to 1:200,000 available iodine, will destroy all vegetative forms of bacteria in 15 minutes. Even in such dilutions, the solutions provide a color indication of antimicrobial activity. If there is no color, there is no germicidal activity.

The aqueous antiseptic iodophor solutions of the present invention include about 0.0001% to about 20%, and preferably about 0.004% to about 10.0% by weight, of a water soluble iodide salt or hydriotic acid. Potassium iodide is preferred, but any of the well-known soluble salts of iodine, such as sodium iodide or hydriotic acid may also be employed. The iodide salt aids in the initial solubilization of the iodine and simplifies the manufacture of the final solutions.

In solution, the water soluble iodide salt results in the formation of the negative iodide ion. This ion reacts with the iodine in accordance with the well-known reaction:

$$I_2 + I^- \rightarrow I^-_3$$

The resultant triiodide ion is water soluble and yields free iodine in the use applications of the solution of the present invention. It is not known whether the boric acid and polyvinyl alcohol form complexes with $I_2$ or $I^-_3$.

A wide variety of polyvinyl alcohols in amounts from about 0.001% to about 25%, and preferably from about 0.1% to about 20.0% by weight, may be used in the composition of the present invention. Various grades of polyvinyl alcohol are available commercially from a number of sources. Examples of these include Elvanol (E.I.DuPont de Nemours and Co., Inc., Wilmington, Del. and Vinol (Colton Chemical Co., Cleveland, Ohio). Polyvinyl alcohols are synthetic water soluble resins derived through controlled polymerization of vinyl acetate and partial or complete hydrolysis of the polyvinyl alcohol. By varying the degree of polymerization and the extent to which the acetate groups and the polymer chain are hydrolyzed, a versatile series of resins useful in the present invention may be obtained. Solution viscosity increases with increasing degrees of polymerization; accordingly, one may choose the grade of polyvinyl alcohol best suited for a particular use from a rather wide resin series. The same degree of flexibility exists with respect to the degree of polyvinyl acetate hydrolysis. Elvanol, for example, is available in grades which produce 4% solutions having viscosity range of 1.8 – 135 cp at 20°C and a percentage hydrolysis ranging from 85–100%. The polyvinyl alcohols when dissolved in water yield solutions having a pH within the range of 5-8; maximum stability is obtained with acid pH. Depending on the concentration and particular polyvinyl alcohol employed, the viscosities of the solutions of the present invention may be varied in the range of from 1.1 to 10,000 cp at 20°C. Polyvinyl alcohols may be depicted as follows:

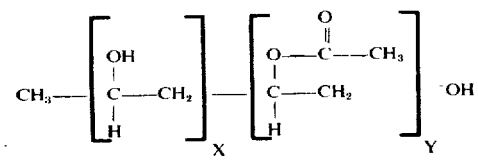

The "X" and "Y" refer, respectively, to the relative number of free hydroxyl and acetylated groups in the resin chain. Polymers which are completely hydrolyzed to polymers containing about 25% acetate groups are suitable in the compositions of the present invention.

A particularly suitable polyvinyl alcohol is that sold under the trade name of Elvanol 5105. This particular grade of polyvinyl alcohol is from 88% to 90% hydrolyzed and has a volatile content of up to 5%. A 4% solution of this material in water has a viscosity of 5cp at 20°C.

The boric acid employed in the composition of the present invention stabilizes the composition and enhances shelf life. The boric acid may be employed in amounts from 0.0001% to about 10% by weight and preferably, from about 0.05% to 5.0% by weight.

To further enhance stability, it is desirable to adjust the hydrogen ion concentration of the solutions into the pH range of about 3 to 8 and preferably, 3.5 to 7.

Any poorly oxidizable acid may be used to adjust the pH; examples of suitable acids include $H_3PO_4$, HCl, acetic acid, $H_2SO_4$, nitric acid, etc.

In certain applications, it is desirable to adjust the osmotic properties of the solution. Tonicities equivalent of a 0.1% to a 5.0% aqueous sodium chloride solution are desirable to make the aqueous antiseptic iodophor solution of the present invention better tolerated by living tissues. Osmotic properties may be adjusted by adding appropriate amounts of alkali metal and alkaline earth metal salts. Specific examples of suitable salts include NaCl, KCl, $CaCl_2$, $MgCl_2$ and corresponding phosphate, nitrate and sulfate salts.

The wetting and cleaning properties of the antiseptic solution of the present invention can be enhanced by the addition of conventional neutral anionic, cationic, and nonionic detergents. Numerous examples of suitable detergents are well known in the art. Detergents may conveniently be included in the solution in amounts up to 25% by weight.

The antiseptic iodophor solutions of the present invention may be prepared by any of several methods. The preferred method of preparation involves first dissolving the boric acid in water and then dissolving the polyvinyl alcohol, with heat and agitation, in the boric acid solution. The amount of water employed to dissolve the boric acid and polyvinyl alcohol should represent a major portion of the water (70–90% by weight) present in the completed aqueous antiseptic iodophor solution. After the polyvinyl alcohol-boric acid solution has cooled, the iodine and water soluble iodide salt or hydriotic acid in the form of an aqueous solution, are added. The water present in the iodine-water soluble iodide salt solution should represent a minor portion (5–15% by weight) of the water present in the finalized iodophor solution. The pH of the resulting solution may then be adjusted to the desired value and sufficient purified water added to achieve the desired iodophor concentration.

This technique is particularly suitable for preparing the iodophor solutions of the present invention because no heat is required for dissolution of the iodine. Since no heat is used to dissolve the iodine, there is virtually no loss of iodine to the atmosphere.

Iodine availability and stability in the iodophor solutions of the present invention may be determined by direct titration with standardized sodium thiosulfate solutions. This classic oxidation-reduction type reaction is well-known to those skilled in the art of iodine chemistry.

The aqueous antiseptic iodophor solution of the present invention, which may range in composition from concentrates to dilute free iodine releasing products, are useful for cleaning, sanitizing, and disinfecting inanimate as well as animate objects. The composition may be marketed as stable, dilute iodine yielding solutions ready for use or as concentrates which may be diluted according to need prior to use. Additionally, the iodine of the compositions of the present invention may be dissipated at desired rates.

The need for techniques of sterilizing diagnostic and prosthetic devices designed for application in body cavities and on mucous membrane surfaces is ever increasing. Many diagnostic devices and prostheses intended for incorporation into body cavities or for application on living tissue surfaces may be sterilized conveniently by exposing them for short periods of time to solutions of the iodophor of the present invention. After exposure and prior to use of the device, the active iodine maybe destroyed. Typical examples of inanimate medical, diagnostic, and prosthetic surfaces which may conveniently be cleaned and sterilized by the solutions of the present invention include: tonometer footplates prior to intraocular pressure measurement; contact lenses; colostomy units; catheters; dental prostheses; intrauterine, intravaginal and rectal devices; surgical and dental instruments; surgical implants and protheses; oral and rectal thermometers; gonioscopic lenses and other ocular, diagnostic and therapeutic devices; ocular prostheses; enema tips; needles; cystoscopic devices; and plastic entrapped drug carriers applied topically or by implantation.

The antiseptic solutions of the present invention also have wide applicability for cleaning and sterilizing inanimate industrial and medical surfaces. Typical examples include: morgues; food processing and handling facilities; refuse areas; lavatories (hospital baths); dairy equipment and processing; beverage production equipment, animal rooms; surgical environments; laboratories; and sterile areas in pharmaceutical plants.

The iodophor solutions of the present invention are particularly suitable for ridding infectious and pathogenic microorganisms from epidermal and mucousal tissues. Topical applications of aqueous antiseptic iodophor compositions within the scope of the present invention, in proper concentrations, to infected epidermal or mucous membranes provide broad spectrum antimicrobal activity against pathogenic or saprophytic microbes. The iodophor solutions may be applied as a spray, gel, or solution.

Compositions within the scope of the present invention may also be used presurgically over the surgical field to provide protection against post-surgical infections. For example, irrigation of the ocular cul-de-sac with specific compositions of the iodophor solution prior to surgery, can significantly reduce the contamination potential or post-operative complications. The painting of body sites with the solution of iodophor prior to surgical incision can protect the patient from possible chance contamination and infection. Simultaneously, this painting can be used for disclosing or marking the surgical site.

The compositions of the present invention are particularly suitable for sterilizing contact lenses of all types, prior to application to the cornea. Hydrophilic gel (soft) lenses which are now being developed, pose a particularly serious microbial contamination problem. Hydrophilic gel contact lenses made of hydroxyethylmethacrylate (HEMA) alone, or copolymerized with various cross-linking and plasticizing agents, can absorb up to 80% cold water. These lenses also absorb and complex a variety of environmental low molecular weight organic molecules. These organic molecules may serve as nutrients for microorganisms. Because of the suitable environment for microbial growth which these lenses provide, sterilization is essential.

Chemical sterilization of HEMA lenses with conventional sterilizing solutions has presented serious problems. HEMA lenses complex with most of the conventional preservatives, including benzalkonium chloride, chlorhexidine gluconate, thimerosal sodium, chlorobutanol and phenylmercuric acetate. The possibility of ensuing corneal chemical burns with lenses treated with these conventional preservatives has virtually eliminated the use of these well known germicides. Boiling HEMA containing lenses is not an entirely satisfactory method of sterilization since any ocular mucoid material inadequately removed prior to boiling is denatured within the lens matrix. This leads to loss of lens clarity, discomfort, and eventual destruction of the lens. Boiling or autoclaving HEMA lenses is also disadvantageous because it results in a gradual physical change in the lens geometry and porosity.

For many uses, controlled dissipation of the available iodide in iodophor solutions is not a prerequisite for achieving sterility, tissue tolerance, and ultimate safety. However, there are instances where total destruction of the available iodine ($I_2$) is desirable either while the iodophor is acting or after the iodophor has acted. Basically, all compounds commonly known as antioxidants having the appropriate redox potential to convert $I_2$ to $2I^-$ could be used to destroy available iodine. Examples of such compounds would include alcohols, aldehydes, alkenes, alkynes, aromatic hydrocarbons, amides, quinones, hydroxy acids, sugars, amino acids, sulfites, thiosulfates, sulfhydryl containing compounds, and polyunsaturated organics. Solutions of such compounds have been found to destroy all of the available iodine at different rates. Many such compounds will be satisfactory for various industrial purposes. However, safety and tissue tolerance requirements restrict the number of compounds suitable for human and animal use.

Compounds suitable for human and animal use include sodium sulfite, sodium thiosulfate, sodium hydrogen sulfite, cysteine, methionine, ascorbic acid, sorbic acid and disodium edetate. Almost immediate inactivation of available iodine in iodophors takes place upon treatment with greater than molar equivalents of inorganic sulfites and thiosulfates, methionine, cysteine and ascorbic acid. This virtually instant neutralization may be desirable in some instances. Where maintenance of sterility of the treatment system is not required, neutralization can be accomplished quite readily with such compounds. However, in other instances, a slow but predictable rate of iodine dissipation is more desirable. Additionally, maintenance of sterility after treatment may be required with certain prostheses, e.g. contact lenses stored in the storage case. Under such circumstances, it is necessary that the iodine dissipating solution be sterile and have resterilizing capability as well. Thus, an ideal iodine dissipating agent must be able to not only dissipate iodine, but also must act as an antimicrobial preservative, and have good tissue tolerance properties.

It has now been found that an aqueous solution containing from about 0.01 to about 5% by weight sorbic acid, or a soluble salt thereof and from about 0.01 to about 5% by weight ethylenediaminetetraacetic acid or a soluble salt thereof, may be used to dissipate available iodine contained in iodophor solutions. Such solutions dissipate the iodine at a controlled rate, present no serious tissue tolerance problems, and may be sterilized to a preserved solution. This preserved dissipated solution is suitable for dissipating available iodine in iodophor compositions, including the aqueous antiseptic iodophor solutions of the present invention. Typical examples of commercially available iodophors which may be treated with the dissipating solution of the present invention to achieve a controlled, dissipating action include: polyvinylpyrrolidone-iodine; nonylphenolethoxylate-iodine; soluble starch-iodine; beta-cyclodextrin-iodine; polyoxyethylenepolyoxypropylene condensate-iodine; ethoxylated linear alcohol-iodine, etc.

The mechanism for dissipating available iodine by the novel dissipating solution of the present invention is not understood. The sorbic acid or its water soluble salts and ethylenediaminetetraacetic acid or its water soluble salts in an aqueous vehicle can destroy iodine at a predetermined rate ranging from 1 to 300 min. depending upon the concentration of iodine in the iodophor solution; the amount added to the dissipating solution; the concentration of the two ingredients in the dissipating solution; pH; and temperature. The dissipating solution can be conveniently used over a pH range of about 2 to 10; the higher the pH, the more rapid the dissipation of the available iodine. Increases in temperature above room temperature also increases the dissipation rate. The dissipating solution may conveniently be employed in amounts of from 1 to 1000 parts by weight per part by weight of available iodine in the iodophor.

An aqueous solution particularly suitable for maintaining sterility of prostheses, such as contact lenses, may be prepared by admixing from 1.0% to about 10.0% by weight of the aqueous iodophor solution of the present invention with from about 99% to about 90% by weight of the aqueous dissipating solution of the present invention. Prostheses such as contact lenses may be treated by emerging them in the aqueous dissipating solution and then adding the aqueous antiseptic iodophor solution. The available iodine in the iodophor solution acts to sterilize the prostheses and is slowly dissipated by the dissipating solution. After sterilization and dissipation of the available iodine, a solution is provided which will maintain the sterility of the treated prostheses.

The iodophor solutions of the present invention, and similar iodophor compositions which do not contain boric acid, exhibit a color change at different temperatures. At room temperature, such iodophor solutions have a deep burgundy color. In varied low concentrations of the iodophor, the solution is colorless at elevated temperatures. The intensity of the color is related to the temperature over a useful ambient range of about 15°C to about 100°C. A visual temperature sensing device can be prepared by placing the iodophor composition in a transparent vessel such as a hermetically glass sealed container.

Suitable compositions for use in a visual temperature sensing device may comprise from about 0.001% to about 0.01% by weight iodine, from about 0.002% to about 0.02% by weight of a water soluble iodide salt or hydriotic acid, from about 0.025% to about 0.25% by weight of polyvinyl alcohol, and from about 99.72% to about 99.972% by weight water. The solution may also optionally contain from about 0.005% to about 0.05% boric acid. Visual temperature sensing devices containing such solutions may be employed to give a visual estimate of the temperature of the solution or its environment. Such devices have many apparent uses in industry, billboard advertising, etc., as well as in home or hospital environments. In addition to such uses as visual sensing thermometers for industrial and medicinal uses, the devices could be employed in toys and novelty items.

The explanation for the unique color change phenomena of the iodophors of the present invention is not known. However, it may be linked to the intensity of the atomic interaction (complexing) between the iodine and the polyvinyl alcohol (and the boric acid), and the mobility of these atoms at different atomic energy (heat) levels.

The invention will be further explained by reference to the following examples. The following examples, which are not limiting, include preferred embodiments of the present invention. In the following examples, unless otherwise specified, all percentages are by weight.

EXAMPLE 1

The following is an exemplary concentrated formulation:

| | |
|---|---|
| Iodine | 2.0% |
| Sodium Iodide | 2.0% |
| Polyvinyl alcohol (Elvanol 5103) | 20.0% |
| Boric Acid | 2.0% |
| Sulfuric Acid Q.S. to adjust pH to | 4.0 |
| Purified Water Q.S. to make | 100.0% |

The above formulation may be prepared by dissolving the boric acid in about 85% of the total water content. The polyvinyl alcohol is dissolved in the boric acid solution with the aid of heat and agitation and the resultant solution allowed to cool. The iodine and potassium iodide are dissolved in 5 to 10% by weight of the total water content and added to the cooled polyvinyl alcohol-boric acid solution. The pH is then adjusted and the remaining water added.

This formulation may be applied directly to cuts and bruises or used for degerming various surfaces. For some purposes, the solution may first be diluted with water, a dissipating solution, or a detergent solution, to a 0.00005 – 0.05% available iodine content.

EXAMPLE 2

To demonstrate the stabilizing effect of the boric acid, the following formulation was prepared:

| | |
|---|---|
| Iodine | 0.1% |
| Potassium Iodide | 0.2% |
| Polyvinyl alcohol (Elvanol 5105) | 2.5% |
| Purified Water Q.S. to make | 100.0% |

An identical composition was prepared except that it contained 0.5% by weight boric acid. The pH of each formulation was adjusted to 5.5.

Using standard thiosulfate solution titration procedures, the available iodine in each solution was determined shortly after preparation (zero time) after 1 week and after 1 month storage at approximately 70°F, in a closed one ounce polyethylene bottle. The results of this study are presented in Table I. The dramatic and unexpected stabilization by the boric acid addition is readily apparent from the data appearing in the Table.

TABLE I

| | | Available Iodine | |
|---|---|---|---|
| | Zero Time | One Week | One Month |
| With 0.5% Boric Acid | 0.115% | 0.110% | 0.108% |
| Without Boric Acid | 0.115% | 0.090% | 0.078% |

EXAMPLE 3

The following solution is ideal for presurgical cleansing and degerming of dermal and mucuous membranes, including the eye:

| | |
|---|---|
| Iodine | 0.05% |
| Potassium Iodide | 0.1 % |
| Polyvinyl Alcohol (Elvanol 5105) | 2.0 % |
| Boric Acid | 0.1 % |
| Sodium Chloride | 0.9 % |
| Phosphoric Acid Solution to bring to pH | 5.0 |
| Purified Water Q.S. to make | 100.0% |

This ready to use solution may be prepared following the procedures described in Example 1. Ocular lavage 1–2 minutes would in essence provide a sterile field for surgery. Surprisingly, the eye can tolerate this amount of iodine in this form while comparable straight iodine solutions would not be tolerated.

EXAMPLE 4

A solution applicable for cold chemical sterilization of previously cleansed dental or surgical equipment, prostheses and like devices, and inanimate environmental surfaces, may be prepared in accordance with the following formulation:

| | |
|---|---|
| Iodine | 0.02% |
| Sodium Iodide | 0.02% |
| Polyvinyl Alcohol (Vinol PA-20) | 1.0% |
| Boric Acid | 0.2 % |
| Potassium Chloride | 0.5 % |
| Acetic Acid to bring to pH | 4.0 |
| Purified Water Q.S. to make | 100.0 % |

This solution may be prepared in accordance with the method described in EXAMPLE 1.

EXAMPLE 5

A solution suitable for patient use in sterilizing contact lenses of all types, including hydrophilic gel lenses, may be prepared from the following formulation:

| | |
|---|---|
| Iodine | 0.004% |
| Potassium Iodide | 0.008% |
| Sodium Chloride | 0.50 % |
| Potassium Chloride | 0.20 % |
| Polyvinyl Alcohol (Elvanol 5105) | 0.25 % |
| Boric Acid | 0.5 % |
| Hydrochloric Acid Solution to adjust pH to | 4.5 |
| Purified Water Q.A. to make | 100.0 % |

The solution may be prepared in accordance with the method set forth in Example 1.

Samples of this solution were held in clear glass prescription bottles exposed to light at 20°C. Assays utilizing a sodium thiosulfate titration procedure were performed weekly to assess the total available free iodine. There was no significant loss in available free iodine after 65 days. The pH of 4.5 remained at essentially the initial value throughout the test period. Similar tests conducted on test solutions adjusted to higher pH's (up to 7.8) showed a small loss of iodine during the same intervals of time under otherwise identical test conditions.

EXAMPLE 6

The following example demonstrates the antimicrobial effect of solutions of the present invention.

Twenty-four four hour broth cultures of the organisms listed in Table II were centrifuged at 3000 rpm for 20 minutes. The supernatant was decanted and the remaining pellets resuspended in phosphate buffered saline (PBS). 0.2 ml. of each bacterial suspension was added to 3.8 ml. of the test solution or PBS (control culture). This represented a 1:20 dilution of the test reagent.

The resulting suspensions were held at room temperature and assayed at 5, 30 and 60 minutes. The assay procedure consisted of serially diluting the various bacterial suspensions in Tryptic soy broth containing a neutralizing buffer and a surfactant (Tween 80). Ten fold dilutions were employed. The controlled suspensions were measured at 5 minutes and 60 minutes. No loss of titer was observed over this period. The results of this test are summarized in Table II.

A second solution (Solution B) of the following formulation was prepared:

| | |
|---|---|
| Sorbic Acid | 0.1% |
| Trisodium Edetate | 0.1% |
| Sodium Chloride | 0.75% |
| Potassium Chloride | 0.20% |
| 5% Sodium Hydroxide Solution to adjust pH to | 7.4 |
| Purified Water Q.S. to make | 100.0% |

The sterility of Solution B was insured by heating.

Eight different hydrophilic soft gel lenses, one pair of flexible silicone lenses, and two pairs of conventional polymethylmethacrylate lenses supplied by contact lens manufacturers were placed in the transfer unit portion of contact lens cleaning and storage devices of the

TABLE II

| Organism | Time of Exposure of Organisms to Test Solution | | | Control Assay |
|---|---|---|---|---|
| | 5 Minutes | 30 Minutes | 60 Minutes | |
| Staph. aureus | positive | negative | negative | $10^8$ organisms per ml. |
| Strep. Pyogenes | negative | negative | negative | $10^8$ organisms per ml. |
| E. Coli | negative | negative | negative | $10^8$ organisms per ml. |
| Ps. aeruginosa | negative | negative | negative | $10^6$ organisms per ml. |
| C. albicans | negative | negative | negative | $10^5$ organisms per ml. |

EXAMPLE 7

To demonstrate the safety and utility of the solutions of the present invention, the following four tests were performed:

1. For two days, two drops of the solution of Example 5 were instilled into the eyes of two rabbits (four eyes) every ½ to 1 hour during the day (8 A.M. – 5 P.M.). There was no eye irritation.
2. Two rabbits were fitted with representative hydrophilic gel lenses and the lenses were left on for three days in order that the reaction normally occurring after lens insertion had entirely subsided. One lens from each rabbit was removed and replaced with a lens stored in the solution of Example 5 for 48 hours. There was no ocular reaction in the test eye when this was repeated on two consecutive days.
3. In one rabbit, a gel lens stored in the solution of Example 5 was placed on one eye while another lens stored in an isotonic chlorhexidine gluconate 0.005% containing solution was placed in the other eye. The latter eye had some reaction to the chlorhexidine while the eye with the lens treated with the test solution showed no reaction.
4. Installation of the solution of Example 5 (two drops every ½ hour) for a total of three installations in one human volunteer produced no untoward effects.

EXAMPLE 8

The following self-sterilizing solution (Solution A) was prepared in accordance with the procedure of Example 1:

| | |
|---|---|
| Iodine | 0.1% |
| Potassium Iodide | 0.2% |
| Polyvinyl alcohol (Elvanol 5105) | 2.5% |
| Boric Acid | 0.5% |
| Purified Water Q.S. to make | 100.0% | types shown in U.S. Pat. Nos. 3,519,005 and 3,645,284. Four ml. of Solution B (the sterile preservative dissipating solution) were added to each device. From 3 to 6 drops of Solution A (the concentrated disinfectant solution) were added to each device and the test lenses were submerged in the solution for disinfection. Some of the lenses became yellow initially due to their ability to concentrate the available iodine. In these instances, lower levels (from 3 to 4 drops) of the Solution A minimize the initial uptake of iodine. In all instances, the iodine is dissipated from the resulting solution in 1 to 6 hours. At the end of this time, there were no visible or measurable adverse effects on any of the representative lenses in the study. The study was repeated numerous times with basically the same results.

Representative prescription contact lenses were fitted on rabbit corneas after exposure of varying times (1 minute to 8 hours) to mixtures of solutions of A and B in ratio set forth above. There were no adverse effects. Solution A was instilled directly into rabbit eyes with no apparent adverse effects.

Representative lenses were purposely contaminated with actively growing cultures of staphyloccocus aureus, streptoccocus pyogenes, escherichia coli, pseudomonas aeurginosa and candida albicans prior to exposure to mixtures of Solutions A and B described above for varying periods of time. As little as 3 drops of Solution A added to Solution B (resulting concentration of available iodine equivalent to about 0.003% by weight) produced complete kill in 30 minutes.

Representative soft hydrophilic gel, conventional polymethylmethacrylate, and silicone lenses fitted to human corneas were treated with Solutions A and B yielding initial available iodine concentrations ranging from 0.003% to 0.01% for time intervals ranging from 5 minutes to 12 hours. These lenses were subsequently worn by human volunteers without any apparent adverse effects.

What is claimed is:

1. An aqueous, antiseptic, iodophor solution containing
   a. from about 0.00005% to about 10% by weight iodine;
   b. from about 0.001% to about 20% by weight of a water soluble iodide salt or hydriotic acid;
   c. from about 0.001% to about 25% by weight polyvinyl alcohol; and
   d. from about 0.001% to about 10% by weight boric acid.

2. The aqueous solution of claim 1 in which the pH is adjusted to be within the range of about 3 to 8.

3. The solution of claim 2 in which said pH is adjusted with an acid selected from the group consisting of $H_3PO_4$, HCl, acetic, $H_2SO_4$, and nitric.

4. The aqueous solution of claim 2 which has a pH of less than 7.

5. The aqueous solution of claim 1 which contains from about 0.002 to about 5.0% by weight iodine, about 0.004 to about 10.0% by weight water soluble iodide salt or hydriotic acid, from about 0.1 to about 20.0% by weight polyvinyl alcohol, and from about 0.05 to about 5.0% by weight boric acid.

6. The aqueous antiseptic solution of claim 1 in which component (b) is selected from the group consisting of potassium iodide, sodium iodide and hydriotic acid.

7. The aqueous antiseptic iodophor solution of claim 1 in which the tonicity is adjusted to the equivalent of a 0.1% to a 5% aqueous sodium chloride solution.

8. The aqueous solution of claim 7 in which the tonicity is adjusted by the addition of appropriate amounts of alkali metal and alkaline earth metal salts.

9. The aqueous solution of claim 1 having a viscosity range within the range of from 1.1 to 10,000 cp at 20°C.

10. The aqueous solution of claim 1 which has a surface tension within the range of from about 40 to about 72 dynes/cm².

11. The aqueous solution of claim 1 in which said polyvinyl alcohol has a viscosity within the range of 1.8 to 135 cp at 20°C in a 4% aqueous solution.

12. The aqueous solution of claim 11 in which said polyvinyl alcohol is from 85% to 100% hydrolyzed.

13. A method of sterilizing contact lenses comprising:
   a. placing said contact lenses in an aqueous solution comprising from about 0.01% to about 5% by weight sorbic acid or a soluble salt thereof; and from about 0.01% to about 5% by weight ethylenediaminetetraacetic acid or a soluble salt thereof; and
   b. adding to said solution about 1.0% to about 10.0% by weight based on the total weight of the combined solutions, of an aqueous antiseptic iodophor solution containing from about 0.00005% to about 10% by weight iodine; from about 0.0001% to about 20% by weight of a water soluble iodide salt or hydriotic acid; from about 0.001% to about 25% by weight polyvinyl alcohol; and from about 0.001% to about 10% by weight boric acid.

14. The process of claim 13 in which said aqueous antiseptic iodophor solution has a pH within the range of about 3 to 7.

15. A sterile aqueous solution comprising an admixture of
   a. from about 1.0% to about 10.0% of an aqueous iodophor solution containing from about 0.00005% to about 10% by weight iodine, from about 0.0001% to about 20% by weight of a water soluble iodide salt or hydriotic acid, from about 0.001% to about 25% by weight polyvinyl alcohol, and from about 0.001% to about 10% by weight boric acid; and
   b. from about 99.0% to about 90.0% of a sterile aqueous solution comprising from about 0.01% to about 5% by weight sorbic acid or a soluble salt thereof, and from about 0.01% to about 5% by weight ethylenediaminetetraacetic acid or a soluble salt thereof.

16. A method of preparing an aqueous, antiseptic iodophor solution comprising:
   A. based on the total weight of the iodophor solution, dissolving from about 0.001% to about 10% by weight boric acid, and from about 0.001% to about 25% by weight PVA, in a major portion of the total amount of water present in the iodophor solution;
   B. based on the total weight of the iodophor solution, dissolving from about 0.00005% to about 10% by weight iodine, and from 0.0001% to about 20% by weight of a water soluble iodide salt or hydriotic acid, in a minor portion of the total amount of water present in the iodophor solution; and
   C. admixing the solution of step A with the solution of step B.

17. The method of claim 16 which includes the additional step of adjusting the pH of the iodophor solution to within the range of 3 to 8.

* * * * *